United States Patent
Bertram et al.

(10) Patent No.: US 7,525,414 B2
(45) Date of Patent: Apr. 28, 2009

(54) APPARATUS, SYSTEM, AND METHOD FOR AURALLY INDICATING PROGRESS

(75) Inventors: Randal Lee Bertram, Raleigh, NC (US); Andrew Ehrenzeller, Cary, NC (US); Alan J. Happ, Raleigh, NC (US); Mark E. Molander, Cary, NC (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/375,227

(22) Filed: Mar. 14, 2006

(65) Prior Publication Data

US 2007/0223396 A1    Sep. 27, 2007

(51) Int. Cl.
*G08B 3/00* (2006.01)

(52) U.S. Cl. .............. 340/384.1; 340/995.24; 340/825.36; 340/825.49; 340/539.1; 340/539.11; 340/539.23; 340/825.19

(58) Field of Classification Search ......... 340/991, 340/995.24, 384.1, 825.36, 825.49, 539.1, 340/539.11, 539.23, 825.19
See application file for complete search history.

(56) References Cited

U.S. PATENT DOCUMENTS

| | | | |
|---|---|---|---|
| 5,169,153 A | 12/1992 | Levy et al. | 273/241 |
| 5,420,409 A | 5/1995 | Longacre, Jr. et al. | 235/462 |
| 6,064,409 A | 5/2000 | Thomsen et al. | 345/978 |
| 6,584,601 B1 | 6/2003 | Kodosky et al. | 716/4 |
| 7,039,522 B2 * | 5/2006 | Landau | 701/211 |
| 2005/0048450 A1 | 3/2005 | Winkler | 434/185 |
| 2005/0099291 A1 | 5/2005 | Landau | |

OTHER PUBLICATIONS

Drndarevic, V., et al. 'A PC-Based Radiation Monitor', Pribory I Tekhnika Eksperimenta, No. 1, pp. 115-118, Jan.-Feb. 1999.

* cited by examiner

*Primary Examiner*—Daryl C Pope
(74) *Attorney, Agent, or Firm*—Kunzler & McKenzie

(57) ABSTRACT

A method is disclosed for aurally indicating progress. In one embodiment, a node count module determines a node threshold. A discovery module searches for a plurality of nodes over a communications channel wherein each node is autonomously connected to the communications channel. In addition, the discovery module receives a reply from a node. The node count module may direct an indicator module to modify an aural indicator in response to the node count exceeding the node threshold. The indicator module further emits the aural indicator.

7 Claims, 7 Drawing Sheets

APPARATUS, SYSTEM, AND METHOD FOR AURALLY INDICATING PROGRESS

BACKGROUND OF THE INVENTION

1. Field of the Invention

This invention relates to aurally indicating progress and more particularly relates to aurally indicating progress in discovering nodes.

2. Description of Related Art

A communications channel such as a network may be configured to communicate with a plurality of nodes. Each node may autonomously connect and disconnect from the communications channel. Thus a node may be connected to the communications channel without registering with an administrative function. For example, a network may include a plurality of data processing device nodes. A user may connect and disconnect a data processing node without registering the node.

Unfortunately, an administrative function such as a communications channel manager may need to periodically identify the nodes that are connected to the communications channel. For example, plurality of server nodes may be connected to a communications channel that includes a network. An administrative function may need to identify the server nodes connected to the communications channel in order to manage the server nodes.

Alternatively, a computer may include a plurality of device nodes. A device node may be a video controller, a network interface card, a camera, or the like. The device nodes may communicate over one or more internal communications channels such as a personal computer interface ("PCI") channel. An administrative function for the computer may need to identify each device node that is in communication with a communications channel so that each device node may be configured and utilized.

The administrative function may discover the nodes connected to the communications channel in order to identify each node. For example, the administrative function may search for nodes by communicating a query to each potential node that is in communication with the communications channel. In addition, the administrative function may receive a reply from each node, indicating that the node is in communication with the channel.

The administrative function may receive replies from the nodes over an extended period. For example, the communications delay between the administrative function and each node may vary, resulting in variable delays in receiving the replies. The administrative function may also communicate the query to each node at a different time, and each node may reply after a variable interval. The number of nodes may also vary. As a result, it may be difficult to predict when all nodes will be discovered.

Software processes typically employ a visual status bar, status indicator, or the like to inform a user when a software process will complete. For example, a status bar may report the percentage of a software process that is complete. Yet the administrative function cannot know in advance how many nodes will reply to a discovery operation. In addition, the administrative function cannot know how long will be required for all nodes to reply. As a result, status bars and status indicators are often unsuitable for indicating progress when discovering nodes over a communications channel.

From the foregoing discussion, it should be apparent that a need exists for an apparatus, system, and method that aurally indicate progress when discovering nodes. Beneficially, such an apparatus, system, and method would provide rich quantitative and qualitative feedback to a user of a discovery process.

SUMMARY OF THE INVENTION

The present invention has been developed in response to the present state of the art, and in particular, in response to the problems and needs in the art that have not yet been fully solved by currently available progress indication methods. Accordingly, the present invention has been developed to provide an apparatus, system, and method for aurally indicating progress that overcome many or all of the above-discussed shortcomings in the art.

The apparatus to aurally indicate progress is provided with a plurality of modules configured to functionally execute the steps of searching for nodes, receiving a reply from a node, and emitting an aural indicator. These modules in the described embodiments include a discovery module and an indicator module.

The discovery module searches for a plurality of nodes over a communications channel. Each node is autonomously connected to the communications channel. The communications channel may be a network, a device bus, or the like. The nodes may be data processing devices, communications devices, peripheral devices, or the like. In one embodiment, the discovery module communicates a request to each node over the communications channel.

The discovery module receives a reply from a node. The reply may be in response to the discovery module's request. The discovery module's searching for and receiving replies from nodes may comprise a discovery process. The indicator module emits an aural indicator in response to the reply from the node. The aural indicator may be an electronically generated sound of a specified duration, volume, and frequency profile. As the discovery module receives replies from a plurality of nodes, the indicator module emits the aural indicator for each reply and/or for each group of replies. The instances of aural indicators may increase to a peak rate of emission as the discovery process peaks, and then decline as the discovery process approaches a conclusion. The apparatus indicates the progress of the discovery process to a user through the change in the rate of emissions.

A system of the present invention is also presented to aurally indicate progress. The system may be embodied in a data processing system. In particular, the system, in one embodiment, includes a communications channel and a computer. The communications channel transmits communications between a plurality of nodes. Each node is autonomously connected to the communications channel. The computer is also connected to the communications channel and includes a discovery module and an indicator module.

The discovery module searches for a plurality of nodes over the communications channel. In addition, the discovery module receives a reply from a node. The indicator module emits an aural indicator in response to the reply. In one embodiment, the indicator module modifies the aural indicator. The modification may be a change in a base frequency, a change in a duration, a change in a volume, and a change in a frequency profile.

In one embodiment, the computer also includes a node count module. The node count module may determine a node threshold. For example, the node count module may set the node threshold at one thousand (1,000) replying nodes. The node threshold may represent a number of replying nodes indicative of a substantially complete discovery process. The node count module may direct the indicator module to modify the aural indicator in response to the node count exceeding the node threshold.

In one embodiment, the computer further includes a milestone module. The milestone module may determine a milestone threshold. For example, the milestone module may set the milestone threshold at five hundred (500) nodes. The milestone threshold may represent an arbitrary number such as one half the number of nodes of the node threshold. In one embodiment, the milestone module determines a plurality of milestone thresholds. The milestone module may direct the indicator module to modify the aural indicator in response to the node count being substantially equivalent to a milestone threshold.

A method of the present invention is also presented for aurally indicating progress. The method in the disclosed embodiments substantially includes the steps to carry out the functions presented above with respect to the operation of the described apparatus and system. In one embodiment, the method includes searching for nodes, receiving a reply from a node, and emitting an aural indicator. The method also may include determining a node threshold, summing each replying node to a node count, and modifying the aural indicator.

In one embodiment, a node count module determines a node threshold. A discovery module searches for a plurality of nodes over a communications channel wherein each node is autonomously connected to the communications channel. In addition, the discovery module receives a reply from a node. The node count module may direct an indicator module to modify an aural indicator in response to the node count exceeding the node threshold. The indicator module further emits the aural indicator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention indicates progress in a discovery process using an aural indicator. In addition, the embodiment of the present invention may provide qualitative and quantitative feedback regarding the completion of the discovery process. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
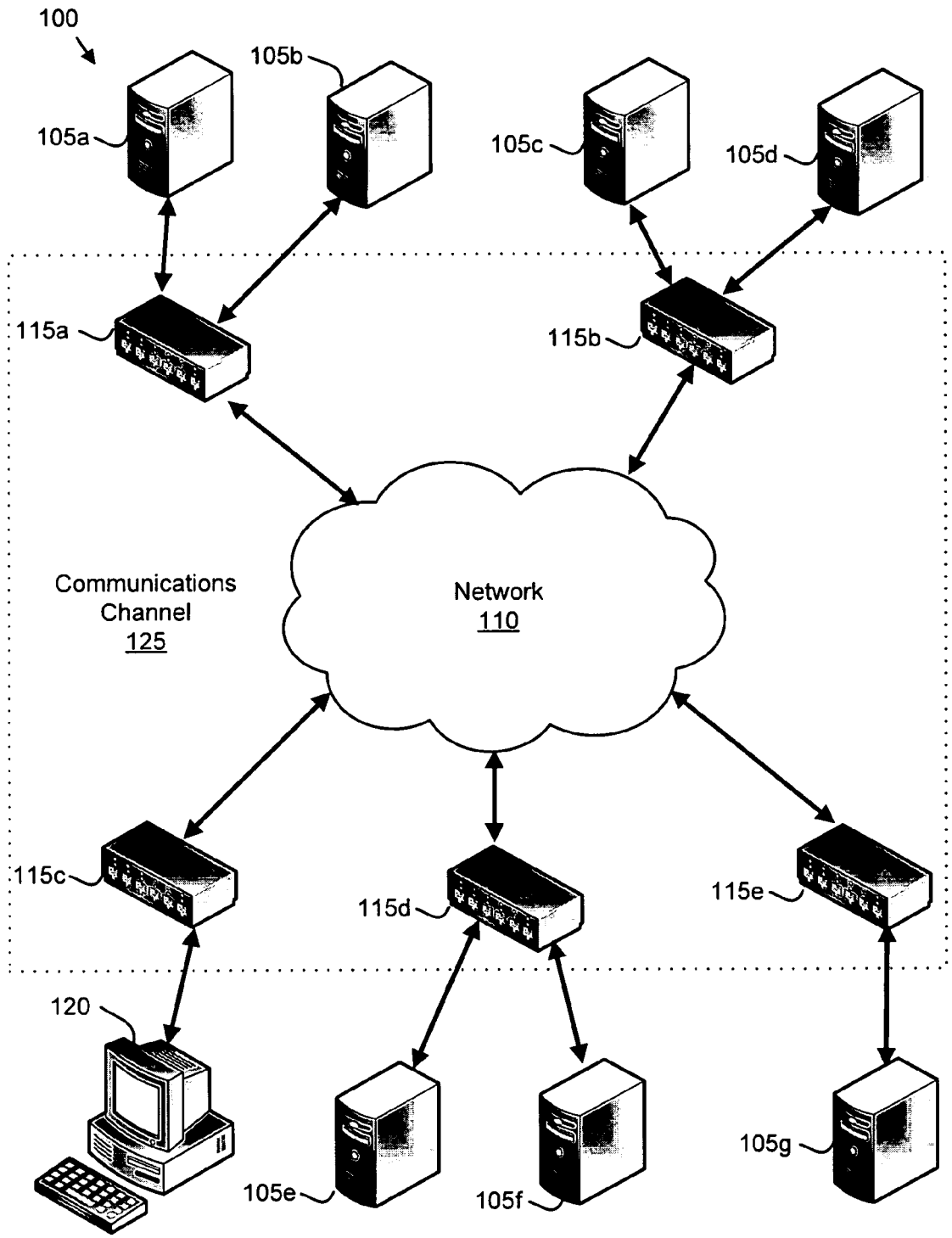
FIG. 1 is a schematic block diagram illustrating one embodiment of a node system in accordance with the present invention.

FIG. 1 is a schematic block diagram illustrating one embodiment of a node system 100 in accordance with the present invention. The system 100 includes one or more nodes 105, one or more bridges 115, a computer 120, and a network 110. The nodes 105 may be configured as servers, computer workstations, communications devices, storage devices, and the like.

The nodes 105 and the computer 120 transmit and receive communications through the bridges 115 and the network 110. In one embodiment, the bridges 115 and network 110 are embodied in a communications channel 125. For example, a first node 105a may communicate with the computer 120 through the communications channel 125 by transmitting and receiving communications through a first bridge 115a, the network 110, and a third router 115c of the communications channel 125.

Each node 105 is autonomously connected to the communications channel 125. A user may add a node 105 to and/or remove a node 105 from the communications channel 125 without registering the node 105 with and/or identifying the node 105 to an administrative function. Thus, the administrative function may have no record of the nodes 105 connected to the communications channel 125.

The computer 120 may execute the administrative function for a user. The administrative function may be configured to manage the nodes 105 through the communications channel 125. In addition, the administrative function may require a record of each node 105 in order to manage the nodes 105.

A discovery module discovers each node 105 that is connected to the communications channel 125 as will be described hereafter. After the nodes 105 are discovered and recorded, the user may manage the nodes 105 using the administrative function. Traditionally, users have relied on a visual indicator such as a status bar, a status indicator, and the like to indicate how much of a software process like the discovery process is completed and how much of the software process remains to be completed. The visual indicator may indicate a completed percentage for the software process and/or a remaining time for the software process.

Unfortunately, discovering the nodes 105 may require an indeterminate time interval to complete. Thus the user may be uncertain when sufficient nodes are discovered so that the user may manage the nodes 105 using the administrative function. In addition, a traditional visual indicator like a status bar may inaccurately indicate completion progress as the time interval required and/or number of nodes to be discovered are uncertain.

The embodiment of the present invention provides an aural progress indicator that supplies qualitative and quantitative information about progress discovering nodes 105 as will be described hereafter. The aural progress indicator may allow the user to assess when sufficient nodes 105 are discovered so that the nodes 105 may be managed.

Figure 2:
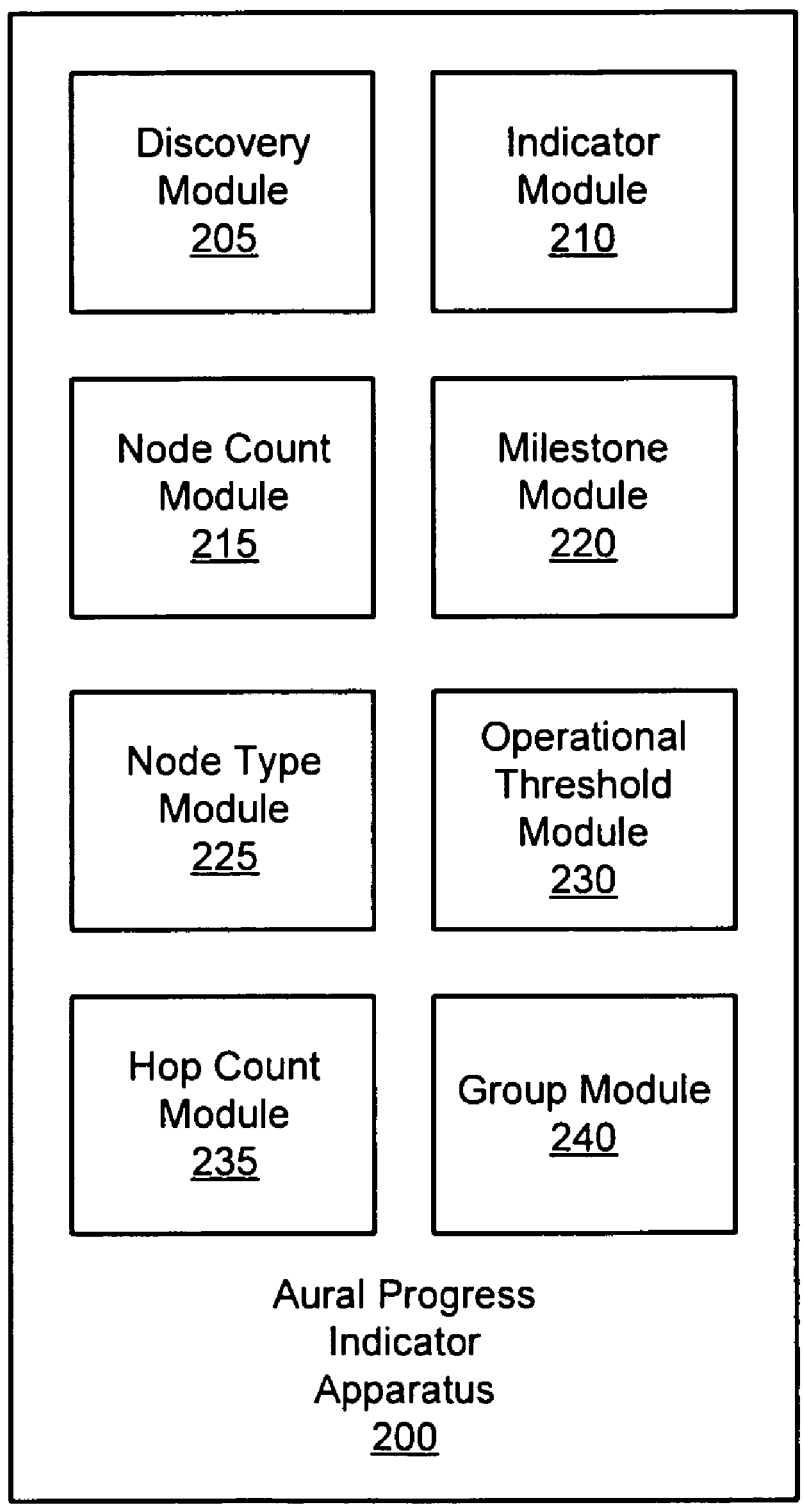
FIG. 2 is a schematic block diagram illustrating one embodiment of an aural progress indicator apparatus of the present invention.

FIG. 2 is a schematic block diagram illustrating one embodiment of an aural progress indicator apparatus 200 of the present invention. The description of the apparatus 200 refers to elements of FIG. 1, like numbers referring to like elements. The apparatus 200 includes a discovery module 205, indicator module 210, node count module 215, milestone module 220, node type module 225, operational threshold module 230, hop count module 235, and group module 240.

The discovery module 205 searches for a plurality of nodes 105 over a communications channel 125. The communications channel 125 maybe configured with the network 110 and bridges 115 of FIG. 1. Alternatively, the communications channel 125 may be a device bus, a wireless network, or the like. For example, the communications channel 125 may be a backplane for communication system wherein each node 105 is a device such as a circuit card. Alternatively, the communications channel 125 may be configured as a wireless network wherein each node 105 is a wireless communications device. In addition, the nodes 105 may be data processing devices, communications devices, peripheral devices, or the like.

In one embodiment, the discovery module 205 communicates a request to each node 105 over the communications channel 125 to discover the nodes 105. In addition, the discovery module 205 receives a reply from a node 105 in response to the request. For example, the node 105 may reply that the node 105 received the request.

The indicator module 210 emits an aural indicator in response to the reply from the node 105. The aural indicator may be an electronically generated sound of a specified base frequency, duration, volume, and frequency profile.

In one embodiment, the node count module 215 determines anode threshold. The node threshold may represent a number of replying nodes indicative of a substantially complete discovery process. In a prophetic example, the node count module 215 may set the node threshold at one thousand (1,000) replying nodes 105 where approximately one thousand replying nodes 105 is indicative of a substantially complete discovery process. The node count module 215 may further direct the indicator module 210 to modify the aural indicator if the node count exceeds the node threshold.

In one embodiment, the milestone module 220 determines a milestone threshold. The milestone threshold may represent an arbitrary number such as one half the number of nodes of the node threshold. Using the previous prophetic example, the milestone module 220 may set the milestone threshold at five hundred (500) nodes indicating that half of the replying nodes 105 indicative of a substantially complete discovery process are received. In one embodiment, the milestone module 220 determines a plurality of milestone thresholds. The milestone module 220 may direct the indicator module 210 to modify the aural indicator in response to the node count being substantially equivalent to a milestone threshold.

In one embodiment, the node type module 225 determines a node type for each replying node 105. In one prophetic example, the node type module 225 determines if the replying node 105 is a server, a computer workstation, or the like. In an alternate prophetic example, the node type module 225 determines if the replying node 105 is a server blade, a data storage blade, a communications blade, or the like. The node type module 225 may direct the indicator module 210 to modify the aural indicator in response to the node type.

In one embodiment, the operational threshold module 230 determines an operational threshold. The operational threshold may be a number of nodes 105 required to begin an operation. In a prophetic example, the operational threshold may be the number of nodes 105 required to begin an administrative function operation that manages the nodes 105. In addition, the operational threshold module 230 may direct the indicator module 210 to modify the aural indicator in response to the node count exceeding the operational threshold.

In one embodiment, the hop count module 235 determines a hop count for a replying node. The hop count may indicate the number of devices that transmit a communication. For example, if the first node 105a transmitted a communication to a second node 105b through the first bridge 115a, the hop count may be two (2) indicating that the first node 105a and the first bridge 115a transmitted the communication. In a certain embodiment, the hop count is recorded in a data field of a packet comprising the communication. The hop count module 235 may direct the indicator module 210 to modify the aural indicator in response to the hop count as will be discussed hereafter.

In one embodiment, the group module 240 determines that each node 105 in a specified node group replies to the discovery module 205. In addition, the group module 240 may direct the indicator module 210 to modify the aural indicator in response to the determination that each node 105 in the specified node group replies to the discovery module 205. The apparatus 200 indicates the progress of the discovery process to a user through a change in the rate of aural indicator emissions and modifications to the aural indicator.

Figure 3:
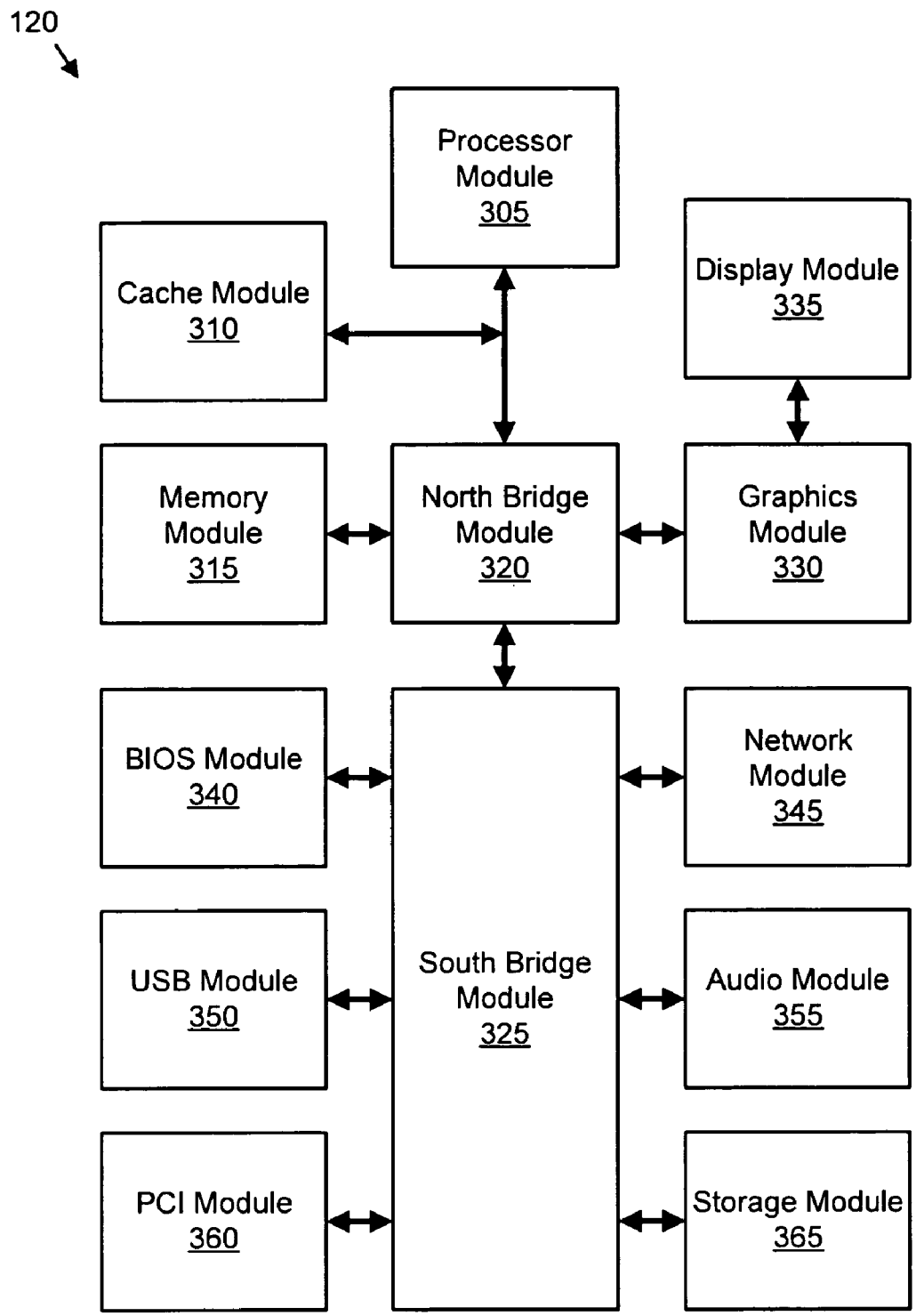
FIG. 3 is a schematic block diagram illustrating one embodiment of a computer in accordance with the present invention.

FIG. 3 is a schematic block diagram illustrating one embodiment of a computer 120 in accordance with the present invention. The computer 120 may be the computer 120 of FIG. 1. In addition, the description of the computer 120 refers to elements of FIGS. 1 and 2, like numbers referring to like elements. The computer 120 includes a processor module 305, a cache module 310, a memory module 315, a north bridge module 320, a south bridge module 325, a graphics module 330, a display module 335, a basic input/output system ("BIOS") module 340, a network module 345, a universal serial bus ("USB") module 350, an audio module 355, a peripheral component interconnect ("PCI") module 360, and a storage module 365.

The processor module 305, cache module 310, memory module 315, north bridge module 320, south bridge module 325, graphics module 330, display module 335, BIOS module 340, network module 345, USB module 350, audio module 355, PCI module 360, and storage module 365, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 315 stores software instructions and data. The processor module 305 executes the software instructions and manipulates the data as is well know to those skilled in the art. In one embodiment, the memory module 315 stores and the processor module 305 executes software instructions that embody the discovery module 205, indicator module 210, node count module 215, milestone module 220, node type module 225, operational threshold 230, hop count module 235, and group module 240 of FIG. 3.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
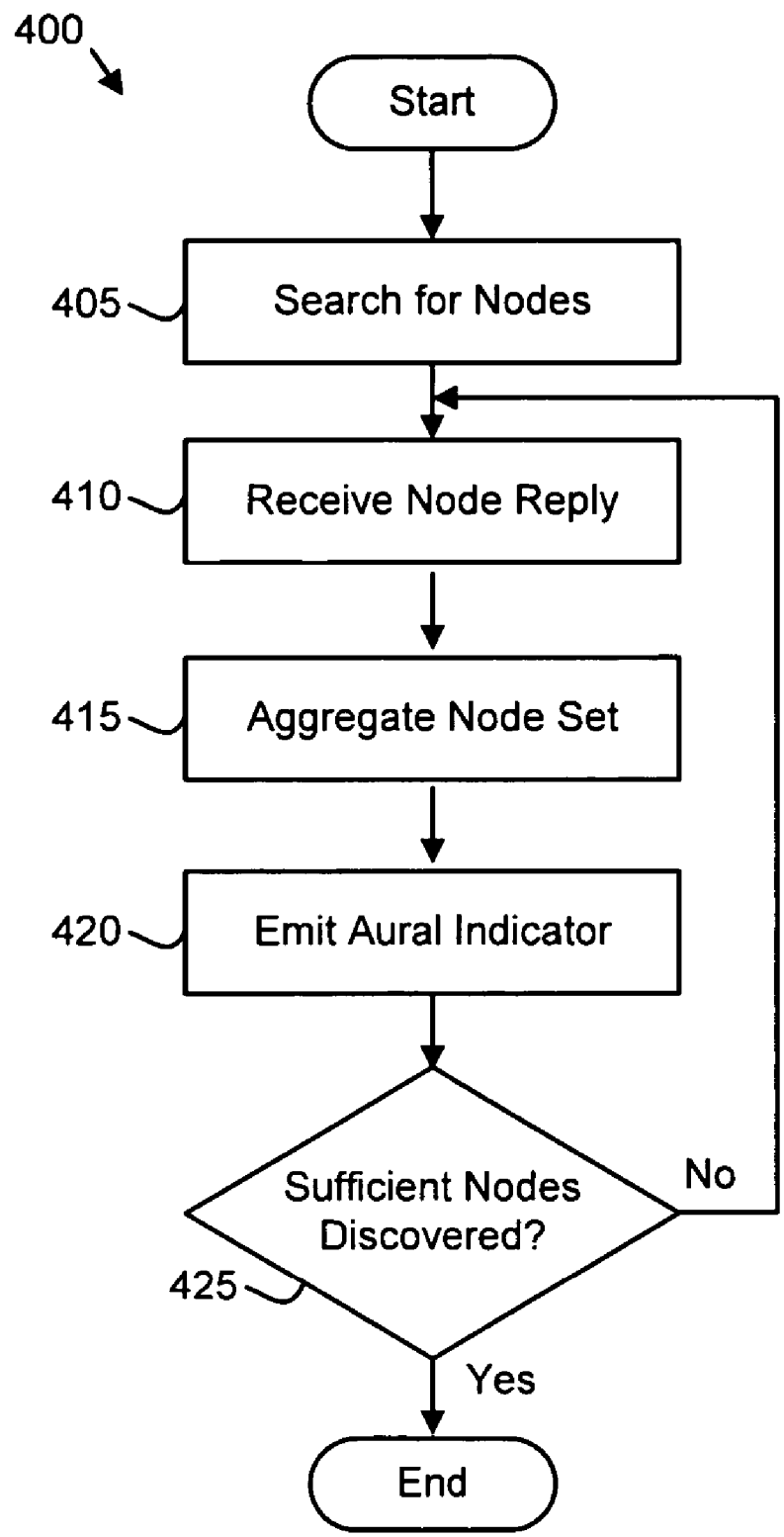
FIG. 4 is a schematic flow chart diagram illustrating one embodiment of an aural progress indication method of the present invention.

FIG. 4 is a schematic flow chart diagram illustrating one embodiment of an aural progress indication method 400 of the present invention. The method 400 substantially includes the steps to carry out the functions presented above with respect to the operation of the described system 100 and apparatus 200, 120 of FIGS. 1-3. In addition, the description of the method 400 refers to elements of FIGS. 1-3, like numbers referring to like elements.

The discovery module 205 searches 405 for a plurality of nodes 105 over the communications channel 125. In one prophetic example, the nodes 105 are configured as servers. In one embodiment, the discovery module 205 communicates a request to each node 105 connected to the communications channel 125 to discover the nodes 105. The request may be configured so that each node 105 receives the request. For example, the request may be configured as a broadcast notice. Each node 105 connected to the communications channel 125 may determine that the broadcast notice request is addressed to that node 105. In the prophetic example above, each server node 105 may read the request from the communications channel 125, decode the request as addressed to that server, and receive the request.

In one embodiment, a portion of the communications channel 125 may be configured as a token ring network with a plurality of nodes 105 connected to the token ring. A node 105 may receive the request from the discovery module 205, retain a copy the request, and communicate the request to another node 105 connected to the token ring. Thus each node 105 connected to the token ring network may receive the request.

The request may direct a node 105 to reply to the discovery module 205. In one embodiment, the request directs a node 105 to reply if the node 105 satisfies one or more specified criteria. In the prophetic example above, the request may direct each server to reply to the discovery module 205 while directing a bridge 115, a computer 120, and the like to refrain from replying to the discovery module 205.

In one embodiment, the request includes a query. In the prophetic example above, the query may ask a server node 105 if the server will be managed by an administrative function associated with the discovery module 205. The administrative function may be configured to manage servers over the communications channel 125.

The discovery module 205 receives 410 a reply from a node 105 over the communications channel 125. By receiving 410 the reply, the discovery module 205 discovers the replying node 105. In one embodiment, each node 105 that receives the request replies to the discovery module 205. In the prophetic example above, each server may reply to the discovery module 205. In a certain embodiment, each node 105 conforming to the specified criteria replies to the discovery module 205.

In one embodiment, each reply includes an identification of the replying node 105. For example, the reply may include the communications channel address of the node 105. A reply may also include a response to a query. In the prophetic example above, the response may indicate if a replying server will be managed by the administrative function.

In one embodiment, the discovery module 205 aggregates 415 at least one replying node 105 as a node set. For example, the discovery module 205 may aggregate an arbitrary number of replying nodes 105 such as five (5) replying nodes 105 as a node set. Aggregating 415 replying nodes 105 allows the discovery module 205 to vary the qualitative and quantitative feedback to a user. In a prophetic example, the discovery module 205 aggregates every ten (10) replying nodes as a node set.

The indicator module 210 emits 420 an aural indicator in response to each node set. The aural indicator may be an electronically generated sound of a specified duration, volume, and frequency profile. The frequency profile may specify the frequencies of the aural indicator over the duration of the aural indicator. In a prophetic example, the frequency profile may specify that the frequency of the aural indicator decline from a base frequency over the duration of the aural indicator emission. In an alternate prophetic example, the frequency profile may specify that the frequency of the aural indicator rise from the base frequency over the duration of the aural indicator emission.

In one embodiment, the operational threshold module 230 determines 425 if sufficient nodes 105 are discovered to support an administrative function. If the operational threshold module 230 determines 425 that sufficient nodes 105 are discovered, the method 400 terminates. If sufficient nodes 105 are not discovered, the discovery module 205 continues to receive 410 node replies.

The method 400 emits an aural indicator for each node set, providing qualitative and quantitative feedback about the discovery process to the user. In a prophetic example, the user can hear a decline in the rate of receiving replying node sets.

Figure 5:
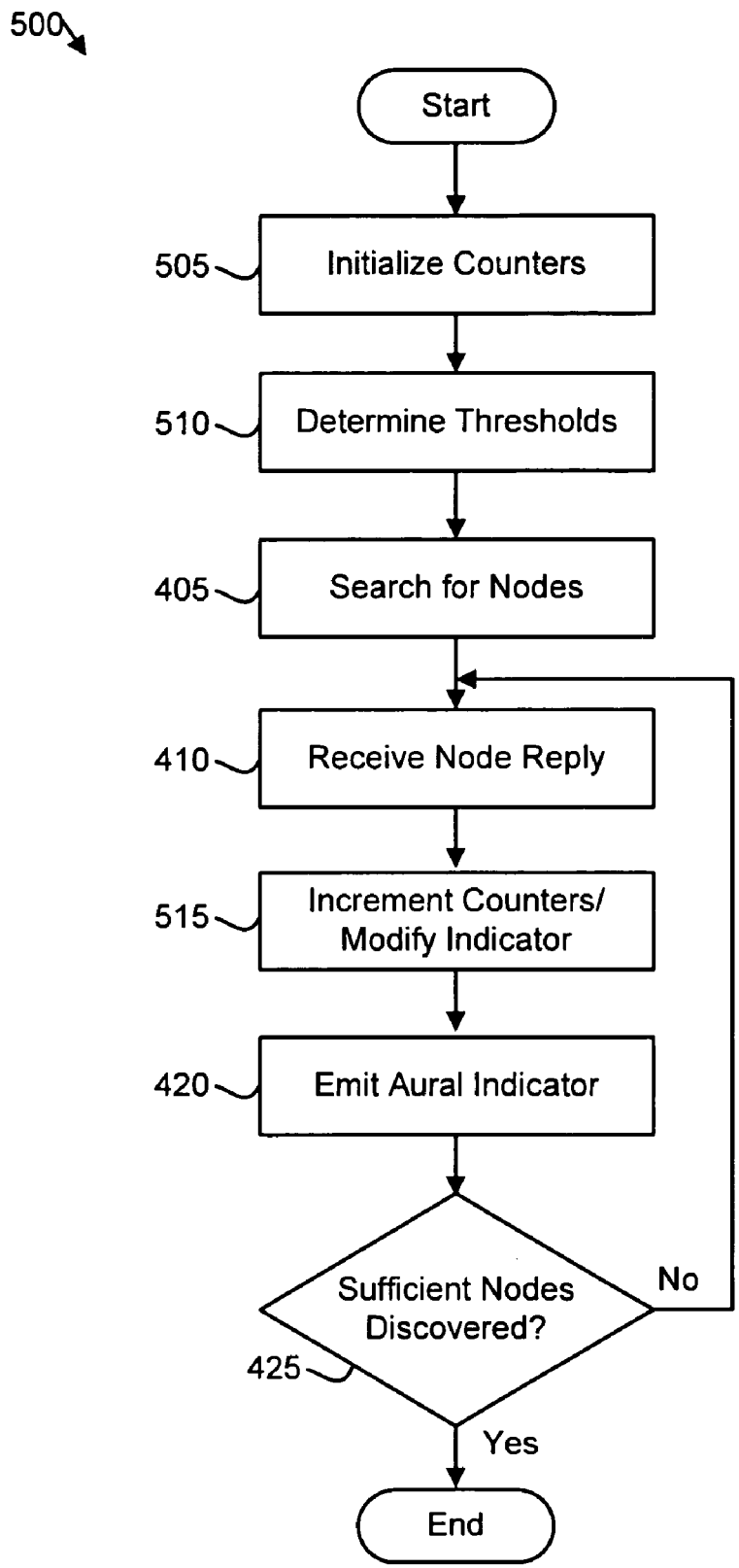
FIG. 5 is a schematic flow chart diagram illustrating one alternate embodiment of an aural progress indication method of the present invention.

FIG. 5 is a schematic flow chart diagram illustrating one alternate embodiment of an aural progress indication method 500 of the present invention. The method 500 substantially includes the steps to carry out the functions presented above with respect to the operation of the described system 100 and apparatus 200, 120, and method 400 of FIGS. 1-4. In addition, the description of the method 500 refers to elements of FIGS. 1-4, like numbers referring to like elements.

The method 500 begins and in one embodiment, the node count module 215 initializes 505 a node count to a specified value. The specified value may be zero (0). In addition, the node count module 215, milestone module 220, and operational threshold module 230 may determine 510 a node threshold, milestone threshold, and operation threshold respectively. The node threshold may specify a number of replying nodes 105 for a substantially complete discovery process. The milestone threshold may specify an arbitrary fraction of the number of replying nodes 105 for a substantially complete discovery process such as seventy-five percent (75%) of the node threshold. In addition, the operational threshold may specify a number of nodes 105 required to begin an operation such as an administrative function. In a certain embodiment, the operational threshold may specify a number of a specified type of nodes 105 required to begin the operation.

The discovery module 205 searches 405 for nodes as discussed previously for FIG. 4. In addition, the discovery module 205 receives 410 a reply from a node 105 as discussed for FIG. 4. In one embodiment, the node count module 215 increments 515 the node count by a specified increment value. The specified increment value may be one (1). The node count module 215, milestone module 220, node type module 225, operational threshold module 230, hop count module 235 and group module 240 may direct the indicator module 210 to modify 515 the aural indicator as will be discussed hereafter for FIG. 6. The indicator module 210 emits 420 the aural indicator and the operational threshold module 230 may determine 425 if sufficient nodes 105 are discovered as discussed previously for FIG. 4 and the method 500 terminates.

Figure 6A:
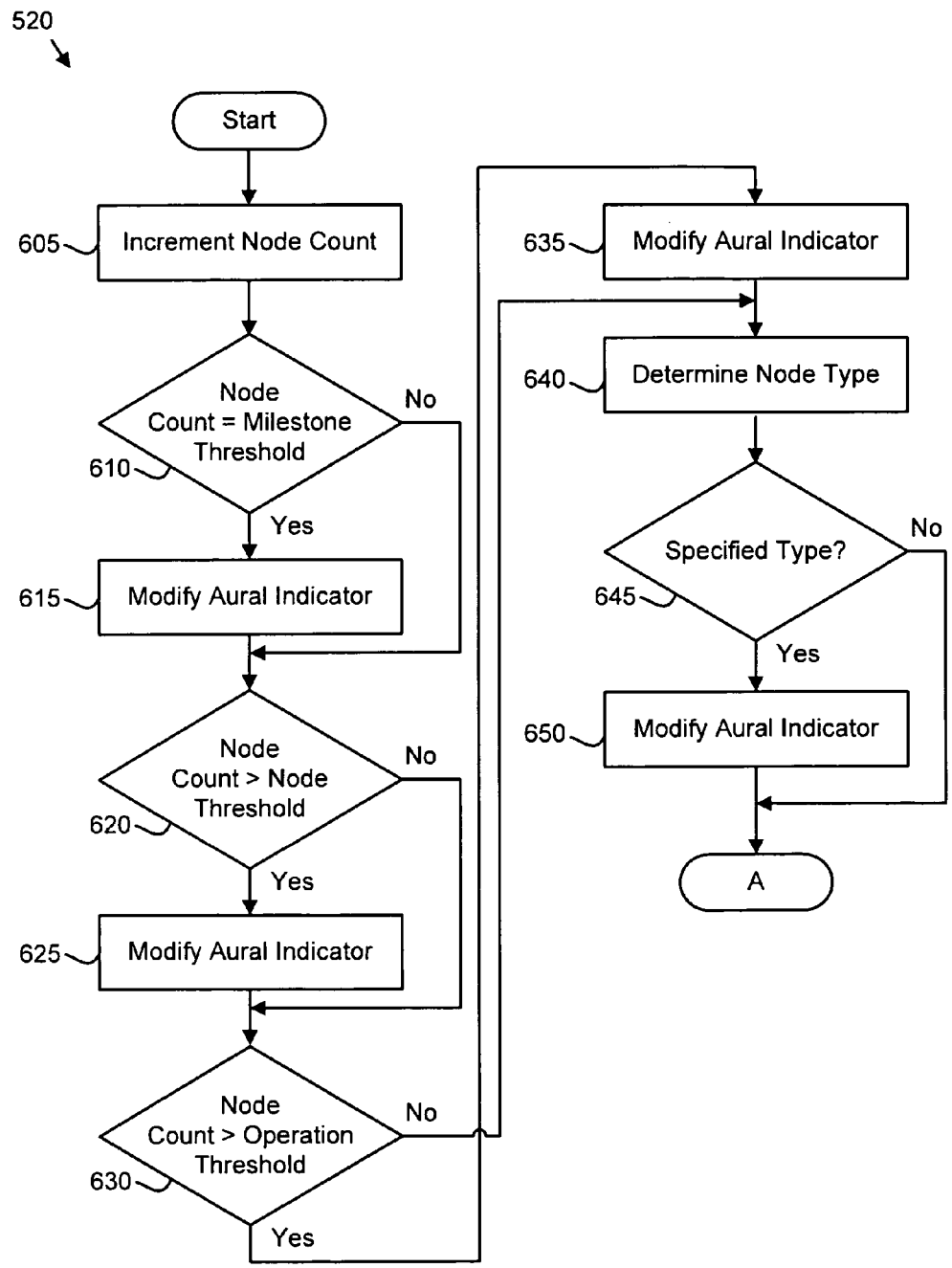
FIGS. 6A and 6B are a schematic flow chart diagram illustrating one embodiment of an indicator modification method of the present invention.

FIG. 6 is a schematic flow chart diagram illustrating one embodiment of an indicator modification method 520 of the present invention. The method 520 substantially includes the steps to carry out the functions presented above with respect to step 520 of FIG. 5. In addition, the description of the method 520 refers to elements of FIGS. 1-5, like numbers referring to like elements.

The method 520 begins and in one embodiment the node count module 215 increments 605 the node count. The node count module 215 may add a value such as one (1) to the node count as is well known to those skilled in the art. The node count may be a data value stored in the memory module 315 of the computer 120.

In one embodiment, the milestone module 220 determines 610 if the node count exceeds a milestone threshold. In a certain embodiment, the milestone module 220 determines 610 if the node count is substantially equal to one of a plurality of milestone thresholds. In a prophetic example, a first milestone threshold may be equal to five hundred (500) replies. If the node count is substantially equivalent to the first milestone threshold, the milestone module 220 may direct the indicator module 210 to modify 615 the aural indicator. In certain embodiment the first milestone threshold is substantially equivalent if Equation 1 is true, where m is the first milestone threshold value, c is the node count, and a is a constant such as fifty (50).

$$m \leq c \leq m+a \qquad \text{Equation 1}$$

The indicator module 210 may modify a base frequency, a duration, a volume, and the frequency profile of the aural indicator. In a prophetic example, the indicator module 210 may modify the aural indicator by increasing the base frequency of the aural indicator. Alternatively, the indicator module 210 may decrease the duration that the aural indicator is emitted. In a certain embodiment, the indicator module 210 modifies the frequency profile of the aural indicator to decline over the duration of the aural indicator. Modifying 615 the aural indicator provides additional qualitative and quantitative feedback to the user.

In one embodiment, if the milestone module 220 determines 610 the node count is substantially equivalent to the milestone threshold or if the milestone module 220 directs the indicator module 210 to modify 615 the aural indicator, the node count module 215 determines 620 if the node count exceeds the node threshold. If the node count exceeds the node threshold, the node count module 215 may direct the indicator module 210 to modify 625 the aural indicator. In a prophetic example, modifying 625 the aural indicator in response to determining 620 that the node count exceeds the node threshold may indicate to the user that the discovery process is substantially complete.

In one embodiment, if the node count module 215 determines 620 the node count does not exceed the node threshold or if the node count module 215 directs the indicator module 210 to modify 625 the aural indicator, the operation threshold module 230 determines 630 if the node count exceeds an operational threshold. If the node count exceeds the operational threshold, the operational threshold module 230 may direct the indicator module 210 to modify 635 the aural indicator. In a prophetic example, modifying 635 the aural indicator in response to determining 630 that the node count exceeds the operational threshold may indicate to the user that user may begin to employ the administrative function.

In one embodiment, if the operational threshold module 230 determines 630 the node count does not exceed the operational threshold or if the operational threshold module 230 directs the indicator module 210 to modify 635 the aural indicator, the node type module 225 determines 640 a node type for the replying node 105. In a prophetic example, the node type module 225 may determine that a replying node 105 is a server, a computer 120, or the like. In addition, the node type module 225 may determine 645 if the node type is a specified type. In a prophetic example, if the specified node type is a replying node 105 responding that the replying node 105 will be managed by an administrative function, the node module 225 may direct the indicator module 210 to modify 650 the base frequency of the aural indicator.

Figure 6B:
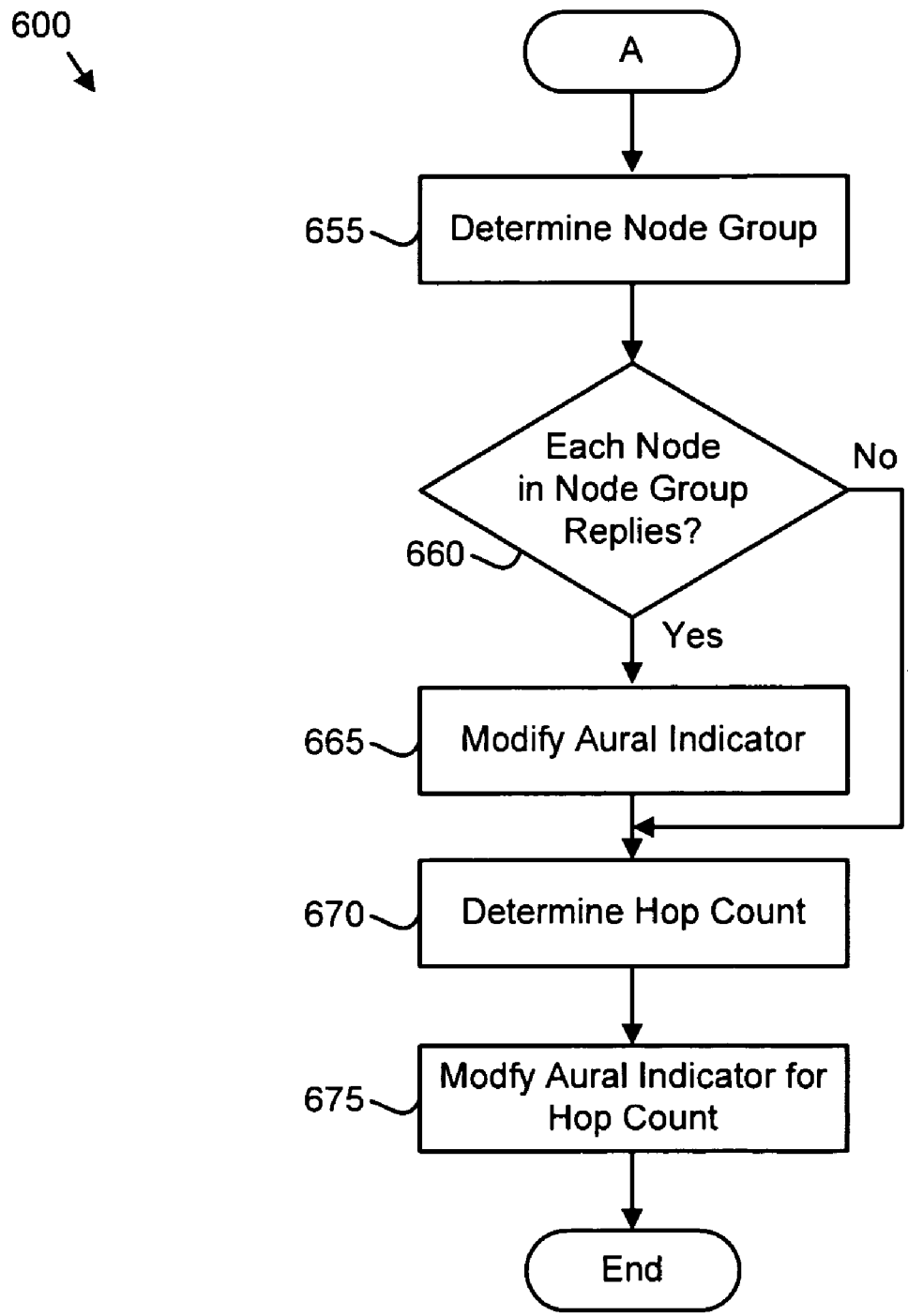

In one embodiment, if the node type module 225 determines 645 that the node type is not the specified node type or if the node type module 225 directs the indicator module 210 to modify 650 the aural indicator, the group module 240 determines 655 the node group of the replying node 105 as shown in FIG. 6B. In a prophetic example, the group module 240 may determine 655 that the replying node 105 is including in a node group that the administrative function is directed to manage.

In addition, the group module 240 may determine 660 if each node 105 in a specified node group replies to the discovery module 205. In the previous prophetic example, the group module 240 may determine 660 if each node 105 that the administrative function is directed to manage is discovered by replying to the discovery module 205. If each node 105 in the specified node group replies, the group module 240 may direct the indicator module 210 to modify 665 the aural indicator.

In one embodiment, if the group module 240 determines 660 replies are not received from each node 105 in the specified node group or if the group module 240 directs the indicator module 210 to modify 665 the aural indicator, the hop count module 235 determines a hop count for the replying node 105. In a prophetic example, the hop count is a number of devices that transmit a reply from the replying node 105 to the discovery module 205.

In one embodiment, the hop count module 235 directs the indicator module 210 to modify 675 the aural indicator in response to the hop count and the method 600 terminates. The hop count module 235 may direct the indicator module 210 to modify 675 the aural indicator using Equation 2, where f is the frequency of the aural indicator, $f_0$ is a base frequency, b is a constant, $h_0$ is a base-line hop count specified by the hop count module 235, and h is the hop count.

$$f = f_0 + b\frac{h}{h_0} \quad \text{Equation 2}$$

Thus the frequency of the aural indicator may change as replies are received from nodes 105 that are removed from the discovery module 205 by larger hop counts. The method 520 modifies the aural indicator to provide qualitative and quantitative feedback about the discovery process to a user.

The embodiment of the present invention indicates progress in a discovery process using an aural indicator. In addition, the embodiment of the present invention may provide qualitative and quantitative feedback regarding the completion of the discovery process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program, wherein the computer readable program when executed on a computer causes the computer to:
   search for a plurality of nodes over a communications channel wherein each node is autonomously connected to the communications channel;
   receive a reply from a node;
   aggregate at least one replying node as a node set;
   determine a node threshold;
   sum each replying node to a node count;
   modify an aural indicator using a modification selected from a change in a base frequency, a change in a duration, a change in a volume, and a change in a frequency profile in response to the node count exceeding the node threshold; and
   emit the aural indicator in response to each node set.

2. The computer program product of claim 1, wherein the computer readable code is further configured to cause the computer to identify a milestone threshold and to modify the aural indicator in response to the node count being substantially equivalent to the milestone threshold.

3. The computer program product of claim 1, wherein the computer readable code is further configured to cause the computer to determine a node type for each replying node and modify the aural indicator in response to the node type.

4. The computer program product of claim 3, wherein the computer readable code is further configured to cause the computer to sum each discovered node of a specified node type as a node type count, determine an operational threshold for the specified node type, and modify the aural indicator in response to the node type count exceeding the operational threshold.

5. The computer program product of claim 1, wherein the computer readable code is further configured to cause the computer to determine that each node in a specified node group replies and to modify the aural indicator in response to the determination that each node in the specified node group replies.

6. The computer program product of claim 5, wherein the node group is configured as a domain.

7. A method for deploying computer infrastructure, comprising integrating computer-readable code into a computing system, wherein the code in combination with the computing system is capable of performing the following:
   determining a node threshold;
   searching for a plurality of nodes over a communications channel wherein each node is autonomously connected to the communications channel;
   receiving a reply from a node;
   determining a node threshold;
   summing each replying node to a node count;
   modifying an aural indicator in response to the node count exceeding the node threshold using a modification selected from a change in a base frequency, a change in a duration, a change in a volume, and a change in a frequency profile; and
   emitting the aural indicator in response to the reply.

* * * * *